United States Patent
Wang et al.

(10) Patent No.: US 8,594,011 B2
(45) Date of Patent: Nov. 26, 2013

(54) METHOD AND APPARATUS FOR ESTABLISHING CONNECTION BETWEEN ENB

(75) Inventors: Hong Wang, Beijing (CN); Huarui Liang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 13/100,485

(22) Filed: May 4, 2011

(65) Prior Publication Data

US 2011/0274030 A1   Nov. 10, 2011

(30) Foreign Application Priority Data

May 7, 2010   (CN) .......................... 2010 1 0175819

(51) Int. Cl.
*H04B 7/14* (2006.01)
(52) U.S. Cl.
USPC ......................................... 370/315; 370/328
(58) Field of Classification Search
USPC .................. 370/315, 328, 338, 401, 349, 389
See application file for complete search history.

(56) References Cited

U.S. PATENT DOCUMENTS

| | | | | |
|---|---|---|---|---|
| 8,391,869 B2* | 3/2013 | Watanabe et al. | ............. | 455/436 |
| 8,401,068 B2* | 3/2013 | Ulupinar et al. | ............. | 375/240 |
| 2008/0181411 A1* | 7/2008 | Norrman et al. | ............. | 380/278 |
| 2010/0008293 A1 | 1/2010 | Gupta et al. | | |
| 2010/0075698 A1* | 3/2010 | Rune et al. | ..................... | 455/458 |
| 2010/0103845 A1* | 4/2010 | Ulupinar et al. | ............. | 370/254 |
| 2010/0103863 A1* | 4/2010 | Ulupinar et al. | ............. | 370/315 |
| 2010/0260096 A1* | 10/2010 | Ulupinar et al. | ............. | 370/315 |
| 2010/0260097 A1* | 10/2010 | Ulupinar et al. | ............. | 370/315 |
| 2010/0260109 A1* | 10/2010 | Ulupinar et al. | ............. | 370/328 |
| 2011/0238834 A1* | 9/2011 | Nair et al. | ..................... | 709/225 |
| 2011/0263282 A1* | 10/2011 | Rune et al. | ..................... | 455/507 |
| 2011/0270994 A1* | 11/2011 | Ulupinar et al. | ............. | 709/227 |

\* cited by examiner

*Primary Examiner* — Ricky Ngo
*Assistant Examiner* — Christine Ng
(74) *Attorney, Agent, or Firm* — Jefferson IP Law, LLP (57) ABSTRACT

A method and an apparatus for establishing a connection between evolved Node Bs (eNBs) are provided. The method includes after finding a new neighboring cell, sending, by a first network node, a first request message carrying information of a third network node, to which the neighboring cell belongs to a second network node, sending, by the second network node, a second request message carrying cell information of the first network node to the third network node, sending, by the third network node, a first response message carrying information of the first network node to the second network node, and sending, by the second network node, a second response message carrying cell information of the third network node to the first network node, for establishing, by the first network node, a communication connection between the first network node and the third network node with the cell information of the third network node. The present invention may establish the X2 interface connection between a Relay eNB or a Home eNB (HeNB) and other eNBs, and implement the X2 interface based application, such as the mobile handover.

27 Claims, 8 Drawing Sheets

METHOD AND APPARATUS FOR ESTABLISHING CONNECTION BETWEEN ENB

PRIORITY

This application claims the benefit under 35 U.S.C. §119(a) of a Chinese patent application filed on May 7, 2010 in the Chinese Intellectual Property Office and assigned Serial No. 201010175819.3, the entire disclosure of which is hereby incorporated by reference.

BACKGROUND OF THE INVENTION

1. Field of the Invention

The present invention relates to wireless communication technology. More particularly, the present invention relates to a method and apparatus for establishing a connection between evolved Node Bs (eNBs).

2. Description of the Related Art

Figure 1:
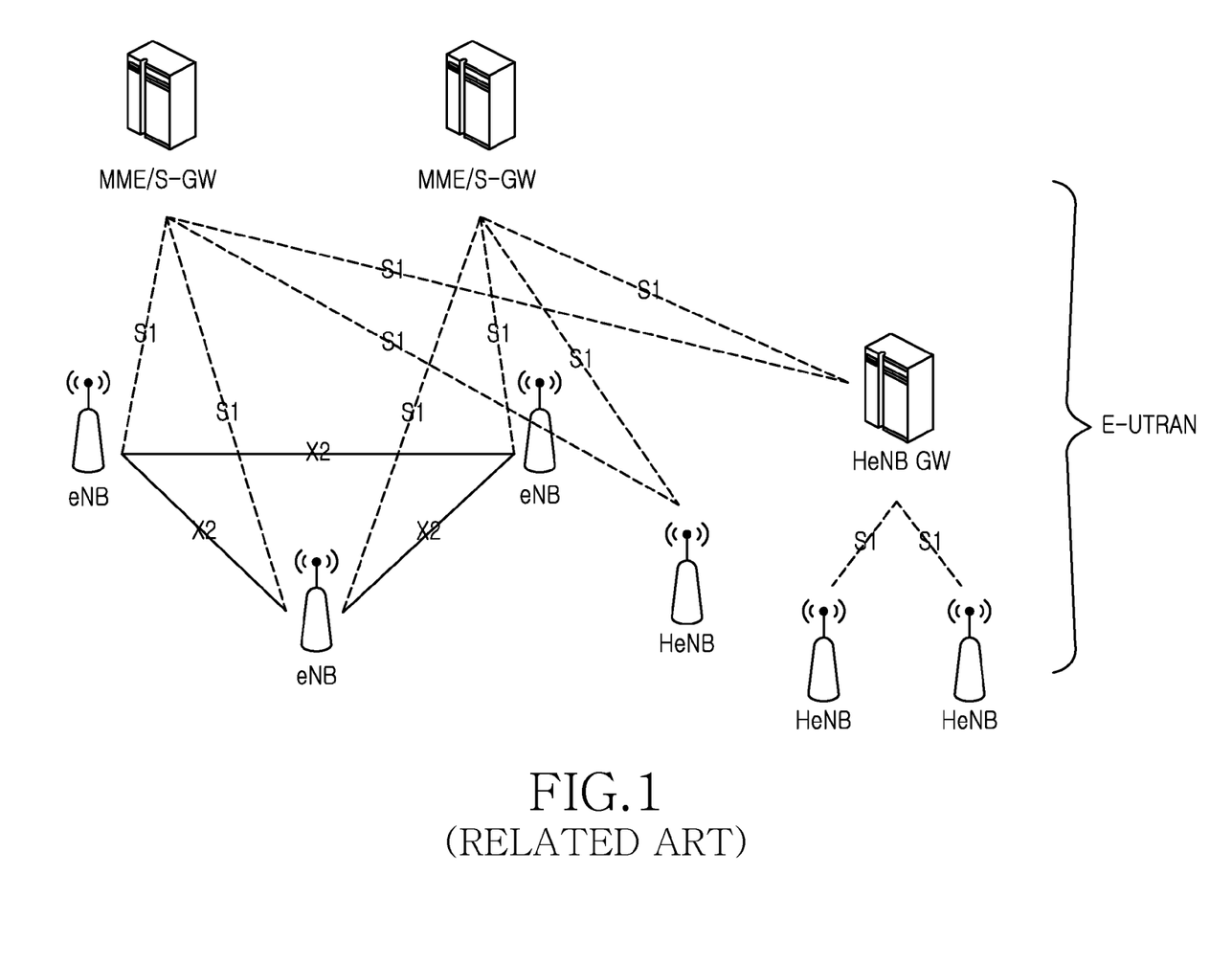
FIG. 1 is a schematic diagram illustrating the architecture of a System Architecture Evolution (SAE) system according to the related art.

With the development of the communication technologies, the mobile communication system has developed the System Architecture Evolution (SAE) system. The SAE system includes the Evolved Universal Terrestrial Radio Access Network (E-UTRAN) and core network. FIG. 1 is a schematic diagram illustrating the structure of an SAE system according to the related art.

Referring to FIG. 1, eNBs, which are responsible for providing wireless interfaces used for accessing the SAE system for mobile phones, belong to the wireless access network. The Mobility Management Entity (MME) and Service Gateway (S-GW) belong to the core network, and connect with an eNB through an S1 interface (the S1 interface link marked with the dotted line in FIG. 1). The MME is responsible for managing mobile contexts, session context of the User Equipment (UE) and saving information relating to the security of the user. The S-GW is mainly used for providing the user plane function. The MME and the S-GW may be located at a same physical entity. Each eNB connects with multiple MMEs in the MME pool. Each eNB connects with multiple S-GWs in the S-GW pool.

An interface between two eNBs is called an X2 interface (the X2 interface connection in FIG. 1 is marked with a solid line). When a user in a connection mode moves from a source eNB to a target eNB, if there is a direct X2 interface between the two eNBs, the source eNB initiates an X2 interface based handover process. Specifically, the source eNB sends a message to the target eNB for conveying necessary information. The necessary information refers to an X2 signaling context indication, a core network indication, an Identification (ID) of the target cell, encryption ability and encryption information of the UE, connection context information and data bearer Enhanced-Radio Access Bearer (E-RAB) information allocated by the source eNB for the UE. The target eNB prepares resources and notifies the UE of the new configuration of the target cell through the source eNB. The new configuration includes the X2 signaling context indication and a Radio Resource Control (RRC) message to be sent to the UE allocated by the target eNB for the UE. The RRC message to be sent to the UE is transparently transmitted to the source eNB. The source eNB sends the message to the UE. The UE is synchronized to the target cell, and sends the message to the target eNB. The target eNB receives the message of the UE, and sends the message to the MME, and switches a downlink data tunnel from the source cell to the target cell. If there is no X2 interface between two eNBs, the source eNB initiates an S1 interface based handover process, i.e. the source eNB sends a message to the MME of the core network. The MME forwards the message between the source eNB and the target eNB.

In the Long Term Evolution-Advanced (LTE-A) system, besides the eNBs, there are two other kinds of access equipment. The two kinds of access equipment connect with each other by accessing other network nodes and the core network, and forward data through the other network nodes, including a Relay eNB or Home eNB (HeNB), etc.

Figure 2:
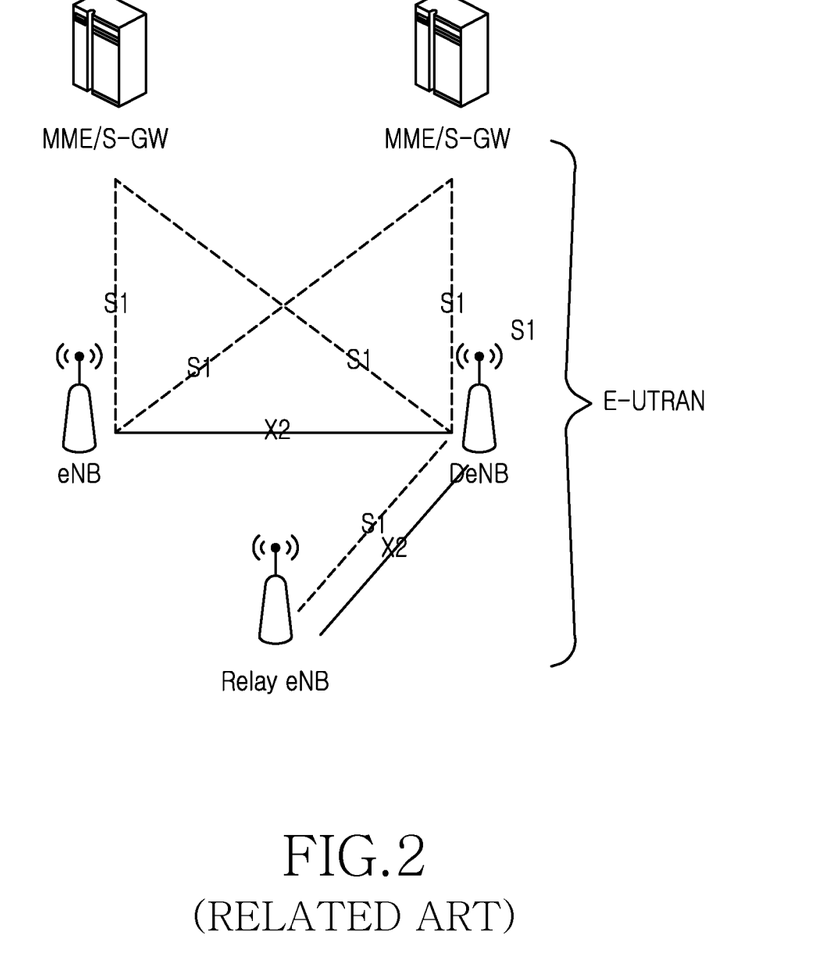
FIG. 2 is a schematic diagram illustrating a network connection of a Relay evolved Node B (eNB) according to the related art.

FIG. 2 is a schematic diagram illustrating network connections of a Relay eNB according to the related art.

Referring to FIG. 2, the eNB connecting with the Relay eNB is called the Dedicated eNB (DeNB). The Relay eNB connects with the DeNB. After startup, the Relay eNB establishes an RRC connection with the DeNB. The S1 and X2 interfaces are used for the RRC connection and the S1 and X2 interfaces of the Relay eNB end at the Relay. The DeNB provides an agent function of the S1 and X2 interfaces between the Relay eNB and other network nodes.

Figure 3:
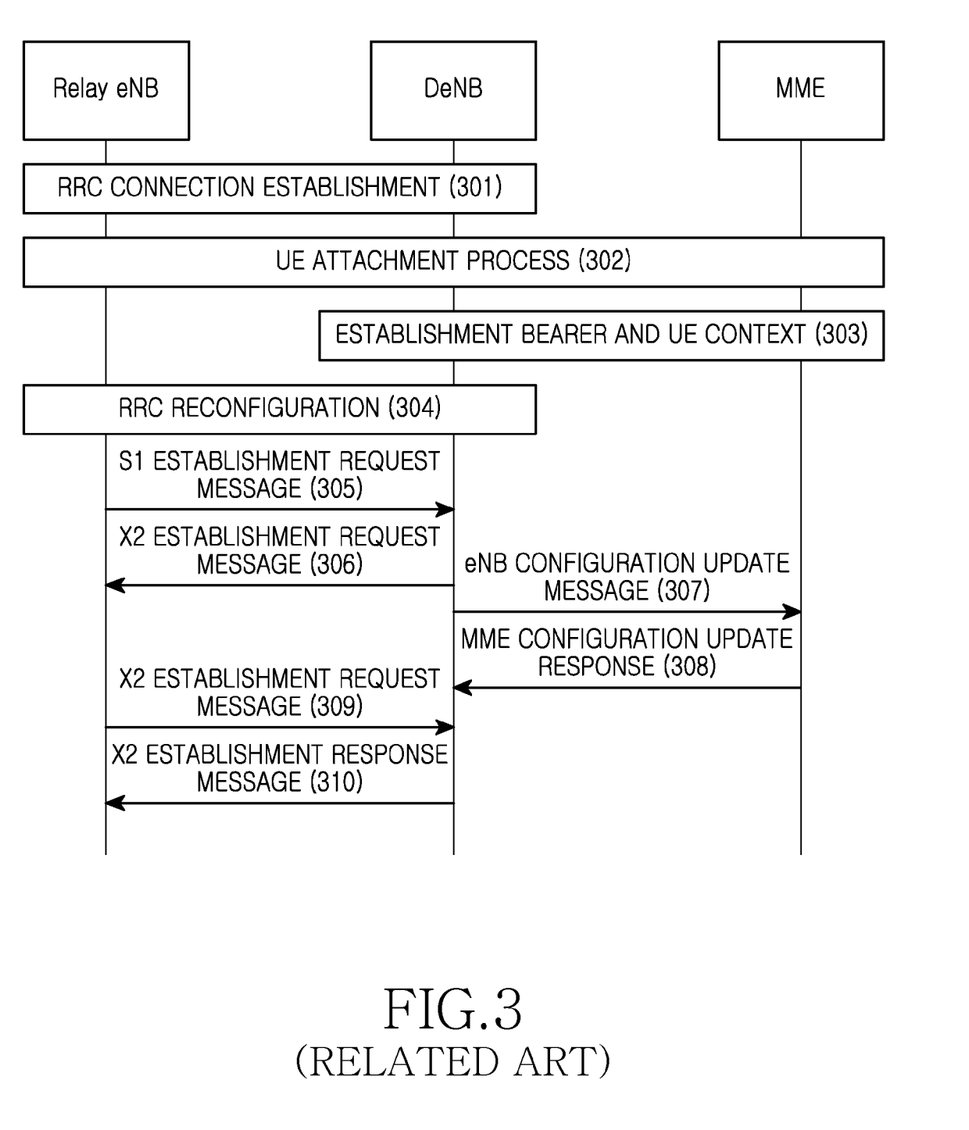
FIG. 3 is a flowchart illustrating a method for establishing an S1 interface and X2 interface after the startup of a Relay eNB according to the related art.

FIG. 3 is a flowchart illustrating a method for establishing the S1 and X2 interfaces after a Relay eNB starts up according to the related art. As shown in FIG. 3, the following steps are included.

Step 301: After startup, the Relay eNB first establishes a RRC connection between the DeNB.

Step 302: The Relay eNB performs UE attachment registration, for sending the information of the UE to the MME. The MME saves the information of the UE and allocates a temporary ID for the UE. The process has been defined.

Step 303: A default bearer and UE contexts are established between the MME and DeNB.

Step 304: The DeNB initiates an RRC reconfiguration for reconfiguring the established RRC.

Step 305: The Relay eNB sends an S1 establishment request message, including information such as a Tacking Area Code (TAC) supported by the Relay eNB and Public Land Mobile Network ID (PLMN Id) to the DeNB.

Step 306: The DeNB sends an S1 establishment response message to the Relay eNB. The S1 establishment response message includes the information of the MME providing services to the Relay eNB, such as the operator of the MME, a group code of the MME, an MME code and an MME name.

If the TAC supported by the Relay eNB is different from that supported by the DeNB, step 307 is performed; otherwise step 309 is performed.

Step 307: The DeNB sends an eNB configuration transmission message to the MME, for updating a TAC list supported by the DeNB.

Step 308: The MME sends an MME configuration transmission response message to the DeNB.

Step 309: The Relay eNB sends an X2 establishment request message to the DeNB. The X2 establishment request message includes information of cells of the Relay eNB. Optionally, the message includes information of neighboring cells of the Relay eNB, and information of the MME pool, to which the Relay eNB belongs.

Step 310: The DeNB sends the X2 establishment response message to the Relay eNB. The X2 establishment response message includes cell information of the DeNB, and optionally includes the information of neighboring cell of the DeNB and information of the MME pool to which the DeNB belongs.

The Home eNB is a plug and play eNB, including the Home eNB (HeNB) and Home Node B (HNB). The HeNB is used in the LTE and LTE-A systems. The HNB is used in the Universal Mobile Telecommunication System (UMTS) system. The HeNB connects with the HeNB gateway through the S1 interface and the HeNB gateway connects with the MME/S-GW through the S1 interface. In addition, the Home eNB may also directly connect with the MME/S-GW without the GW.

Since in the handover process of the UE, the source eNB and target eNB connect with each other through the X2 interface, the UE may switch from the Relay eNB or the HeNB to other eNBs, or switch from the eNB to the Relay eNB or HeNB, the X2 interface connection needs to be established between the Relay eNB or HeNB and other eNBs in advance. However, the method of the related art only discloses establishing the X2 interface between the Relay eNB and the DeNB, but does not disclose a method for establishing the X2 interface connection between the Relay eNB or HeNB and other eNBs. Thus, X2 interface based applications such as the mobile handover cannot be implemented.

SUMMARY OF THE INVENTION

Aspects of the present invention are to address at least the above-mentioned problems and/or disadvantages and to provide at least the advantages described below.

Accordingly, an aspect of the present invention is to provide a method and apparatus for establishing a connection between evolved Node Bs (eNBs), so that n X2 interface connection is established between the Relay eNB or Home eNB (HeNB) and other eNBs, and the X2 interface based application, such as the mobile handover is implemented.

In accordance with an aspect of the present invention, a method for establishing a connection between eNBs is provided. The method includes after finding a new neighboring cell, sending, by a first network node, a first request message carrying information of a third network node, to which the neighboring cell belongs to a second network node, sending, by the second network node, a second request message carrying cell information of the first network node to the third network node, sending, by the third network node, a first response message carrying information of the first network node to the second network node, and sending, by the second network node, a second response message carrying cell information of the third network node to the first network node, for establishing, by the first network node, a communication connection between the first network node and the third network node with the cell information of the third network node, wherein the third network node comprises a Relay eNB, a Home eNB (HeNB), or an eNB, the first network node comprises the Relay eNB, the second network node comprises a Dedicated eNB (DeNB) connected with the Relay eNB, or the first network node comprises the HeNB and the second network node comprises a Gateway (GW) connected with the HeNB.

In accordance with another aspect of the present invention, a method for establishing a connection between eNBs is provided. The method includes after finding a new neighboring cell, sending, by a third network node, a first request message carrying information of a first network node, to which a neighboring cell belongs to a second network node, sending, by the second network node, a second request message carrying cell information of the third network node to the first network node, sending, by the first network node, a first response message carrying information of the third network node to the second network node, and sending, by the second network node, a second response message carrying cell information of the first network node to the third network node, for establishing, by the third network node, a communication connection between the first network node and the third network node with the cell information of the first network node, wherein the third network node comprises a Relay eNB, an HeNB, or an eNB, the first network node comprises the Relay eNB, the second network node comprises a DeNB connected with the Relay eNB, or the first network node comprises the HeNB and the second network node comprises a GW connected with the HeNB.

As can be seen from the above technical scheme, exemplary embodiments of the present invention provide a method and apparatus for establishing a communication link, i.e. the X2 interface between the Relay eNB or HeNB and other eNBs, at which the newly-found neighboring cell locates after the Relay eNB or HeNB finds the new neighboring cell. Exemplary embodiments of the present invention further provide a method for establishing a communication link, i.e. the X2 interface between other eNBs and the Relay eNB or the HeNB after the other eNBs find the new neighboring cell. Thus, the X2 interface connection between the Relay eNB or HeNB and the other eNBs can be established, and the X2 interface based application, such as the mobile handover can be implemented.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A method according to exemplary embodiments of the present invention includes two implementation methods.

The first method includes the following steps.

After finding a new neighbor cell, a first network node sends a first request message carrying information of a third network node, to which the neighbor cell belongs, to a second network node.

The second network node forwards the second request message carrying the cell information of the first network node to the third network node.

The third network node sends a first response message carrying information of the first network node to the second network node.

The second network node sends a second response message carrying the cell information of the third network node to the first network node, so that a communication link between the first network node and the third network node can be established with the cell information of the third network node.

The third network node is a Relay evolved Node B (eNB), a Home eNB (HeNB), or an eNB.

The first network node is the Relay eNB, and the second network node is a Dedicated eNB (DeNB) connected with the Relay eNB. Alternatively, the first network node is the HeNB, and the second network node is a Gateway (GW) connected with the HeNB.

The second method includes the following steps.

After finding a new neighbor cell, a third network node sends a first request message carrying information of a first network node, to which the neighbor cell belongs to a second network node.

The second network node sends the second request message carrying the cell information of the third network node to the first network node.

The first network node sends a first response message carrying information of the third network node to the second network node.

The second network node forwards a second response message carrying the cell information of the first network node to the third network node, so that the third network node may establish a communication link between the first network node and the third network node with the cell information of the first network node.

The third network node is the Relay eNB, HeNB, or eNB.

The first network node is the Relay eNB, and the second network node is a DeNB connected with the Relay eNB. Alternatively, the first network node is the HeNB, and the second network node is a GW connected with the HeNB.

The above method is described in more detail through several exemplary embodiments.

In first exemplary embodiment, the first network node initiates a process for establishing an X2 interface with the third network node.

It is supposed that the first network node is the Relay eNB, the second network node is the DeNB connected with the Relay eNB. The third network node is the eNB1. The eNB1 may be an eNB, Relay eNB or HeNB, etc.

If the X2 interface between the DeNB and the Relay eNB has been established when the Relay eNB starts up, the cell of the Relay eNB is a neighbor cell of the DeNB and has been saved in a neighbor cell list of the DeNB. Cells located at different Relay eNBs of a same DeNB may be neighboring cells, or may not be neighboring cells.

Figure 4:
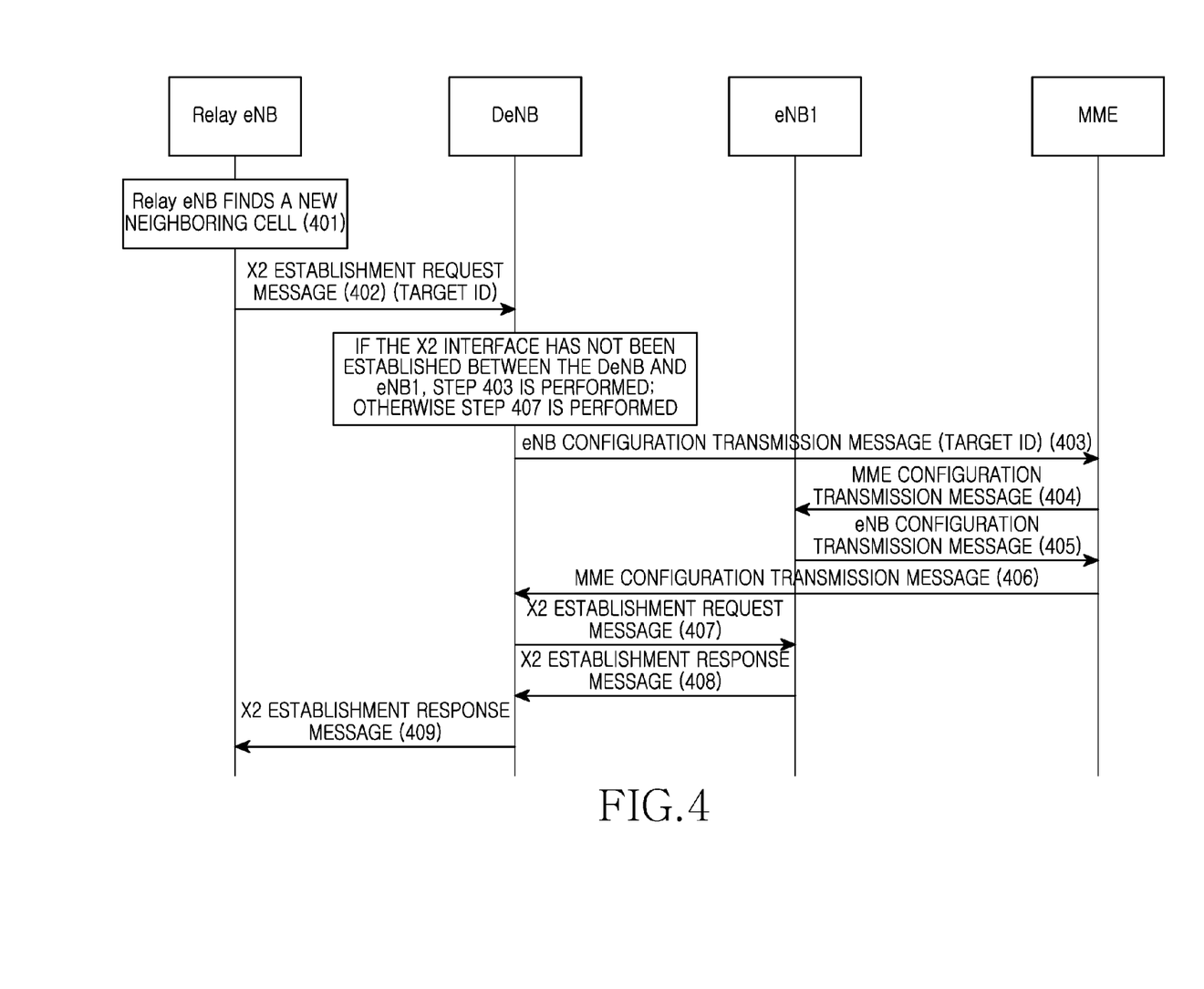
FIG. 4 is a flowchart illustrating a method according to an exemplary embodiment of the present invention.

FIG. 4 is a flowchart illustrating a method according to a first exemplary embodiment of the present invention.

Referring to FIG. 4, the process includes the following steps.

Step 401: The Relay eNB finds a new neighboring cell.

When finishing the startup process of the Relay eNB, the new neighboring cell may be found through a measurement report of a User Equipment (UE). After receiving the measurement report of the UE from an air interface, the Relay eNB reports a physical layer ID of the neighboring cell through the UE. If it is determined that the neighboring cell is not saved in the neighboring cell list of the Relay eNB, the Relay eNB determines that a new neighboring cell is found and adds the information of the neighboring cell in the neighboring cell list. The information of the neighboring cell includes: Evolved Universal Terrestrial Radio Access Network (E-UTRAN) Cell Global Identifier (ECGI), Tacking Area Code (TAC) and Public Land Mobile Network (PLMN) IDs, which are obtained through the measurement report of the UE. This part is the conventional method and it is unnecessary to go into details.

If the Relay eNB needs to establish an X2 interface with an eNB of the newly-found neighboring cell, the following steps are performed. The operation maintenance configures whether the Relay eNB needs to establish the X2 interface with the eNB, to which the newly-found neighboring cell belongs.

When the first network node is the HeNB, and the second network node is the GW, the situation is different from that of the Relay eNB. Take the HeNB for example. After starting up, if the HeNB needs to connect with the GW, the HeNB first establishes an S1 interface with the GW. In addition, when starting up, the HeNB may or may not establish an X2 interface with the GW since the GW is merely a GW, and is not a common eNB as is the DeNB. The GW does not have a service cell, and it is unnecessary to establish an X2 interface when the HeNB starts up. Instead, the X2 interface may be established between the GW when the HeNB needs to establish the X2 interface between the neighboring eNB.

Step 402: The Relay eNB sends an X2 establishment request message to the DeNB. The X2 establishment request message carries a target ID used for establishing the X2 interface between the Relay eNB and the eNB1.

In this step, the target ID may be the ID of the target eNB, or the ID of the target cell. The Relay eNB obtains the unique ID, i.e. the ECGI, of the neighboring cell in the whole network from the measurement report information of the UE. The ID of the eNB is included in the ECGI. The Relay eNB obtains the information of the eNB, to which the newly-found neighboring cell belongs. The eNB1 is the target eNB. If determining that an X2 interface has not been established between the eNB1, the Relay eNB sends an X2 establishment request message carrying the ID of the target eNB (i.e. the ID of the eNB1) to the DeNB. If the X2 establishment request message sent from the Relay eNB carries the ID of the target cell, the DeNB may determine the eNB, to which the target cell belongs, i.e. eNB1 according to the ID of the target cell.

In an exemplary implementation, the X2 interface request message may further carry the information of the source eNB, for instance, at least one of the ID of the Relay eNB, cell information of the Relay eNB, information of the neighboring cell of the Relay eNB, and the information of the MME pool, to which the Relay eNB belongs. The cell information of the Relay eNB may include the ID of the service cell, TAC, the PLMN ID, uplink and downlink frequencies, etc.

The X2 establishment request message may adopt a newly-defined message, or a conventional X2 establishment request message.

If an X2 interface has been established between the Relay eNB and the DeNB, the X2 establishment request message may be transmitted with the X2 interface established between the Relay eNB and the DeNB, or may be transmitted on a new Stream Control Transmission Protocol (SCTP) connection. That is to say, when another X2 interface between the Relay eNB and the DeNB is established, the newly-established X2 interface is distinguished from the existing X2 interface with different SCTP heads. For instance, the SCTP head identifies that the X2 interface is used for communicating with the eNB1. The node 2 may send a message to the eNB1 according to the indication of the head of the SCTP.

If an X2 interface has been established between the Relay eNB and the DeNB, the message in step 402 is transmitted with the established X2 interface. The message may only include a target ID, which may be an eNB ID of the eNB1, or the ID of the neighboring cell sent in step 401 by the Relay eNB. The eNB ID is included in the cell ID, and the target ID is used for indicating the DeNB, with which the Relay eNB wishes to establish an X2 connection, from which the Relay eNB wishes to obtain the configuration information of the eNB1. Optionally, the message may further include the cell information of the Relay eNB, information of neighboring cell of the Relay eNB and information of the MME pool, to which the Relay eNB connects.

After receiving the X2 establishment request message from the Relay eNB, the DeNB first determines that the target eNB is the eNB1 according to the target ID. If an X2 interface has been established between the DeNB and the eNB1, it indicates that the DeNB has obtained and saved the information of the eNB1 when the X2 interface is established, and Step 407 is directly performed. If the X2 interface has not been established between the DeNB and the eNB1, step 403 is performed.

When the first network node is the HeNB, and the second network node is the GW, the HeNB sends the X2 establishment request message to the GW. The X2 establishment request message carries the target ID, for establishing the X2 interface between the HeNB and the eNB1. If an X2 interface has been established between the GW and the eNB1, the GW does not save the information of the eNB1 when establishing the X2 interface. Since the GW is merely a transit node and does not need to save much information, when receiving the X2 establishment request message sent from the HeNB, the GW forwards the message to the eNB1. That is to say, the GW forwards the X2 establishment request message to the eNB1. The message includes the information of the service cell of the HeNB. Optionally, the message further includes information of neighboring cell of the HeNB, or the information of the MME pool, to which the HeNB belongs, etc. The eNB1 sends a response message, i.e. the X2 establishment response message to the GW. The message includes a target address that may be the ID of the target eNB. The message further includes the information of the service cell of the eNB. Optionally, the message further includes the information of neighboring cell of the eNB1 or the information of the MME pool of the eNB1, etc. The two steps correspond to steps 407 and 408 in FIG. 4.

Step 403: The DeNB sends an eNB configuration transmission message to the MME. The eNB configuration transmission message includes the ID of the DeNB and ID of the eNB1.

The source eNB ID of the eNB configuration transmission message is the ID of the DeNB, and may specifically include the ID of the DeNB, the PLMN ID, and the TAC. The target eNB ID of the eNB configuration transmission message is the ID of the eNB1, and may specifically include the eNB ID of the eNB1, the PLMN ID, and the TAC.

Step 404: The MME sends the MME configuration transmission message to the target eNB, i.e. eNB1 according to the eNB ID of the eNB1 carried in the eNB configuration transmission message.

Step 405: The eNB1 sends the eNB configuration transmission message to the MME, and the eNB configuration transmission message includes the transmission layer address, i.e. IP address of the eNB1.

The eNB configuration transmission message further includes the eNB ID of the eNB1 and the eNB ID of the DeNB.

Step 406: The MME sends the information in the eNB configuration transmission message to the DeNB through the MME configuration transmission message.

The DeNB obtains the transmission layer address of the eNB1 through steps 403-406.

Step 407: The DeNB sends the X2 establishment request message to the eNB1. The X2 establishment request message may include the cell information of the Relay eNB.

In this step, the DeNB sends the X2 establishment request message to the eNB1 according to the transmission layer address of the eNB1.

The cell information of the Relay eNB may be directly sent through the X2 establishment request message, or may be sent to the eNB1 taking the cell information of the Relay eNB as the service cell of the DeNB. That is to say, the cell information of the DeNB is sent and the cell of the Relay eNB is taken as a service cell of the DeNB.

The cell information may include the unique ID of the cell in the entire network, the physical layer ID of the cell, the TAC, the PLMN ID, etc. The X2 establishment request message further includes the information of the neighboring cell of the Relay eNB, for instance, the unique ID of the neighboring cell in the entire network, the physical layer ID of the neighboring cell, the downlink frequency, and may further include the information of the MME pool to which the Relay eNB belongs, for instance the group ID of the MME.

Optionally, the X2 establishment request message further includes an indication, indicating that the first network node is the Relay eNB or the HeNB node. Through the indication, the eNB1 may be aware of the characteristics of the first network node, thus, in the third and fourth exemplary embodiments, the target ID is included when the information interaction is performed; otherwise, the target ID is not included.

If the X2 interface has been established between the DeNB and the eNB1, and the DeNB has notified the eNB1 of the cell information of the Relay eNB, steps 407 and 408 may be omitted.

If the first network node is the home eNB, for instance, HeNB, and the second network node is the GW. That is to say, the X2 interface has been established between the GW and the eNB1, but the GW has not notify the eNB1 of the cell information of the HeNB, steps 407 and 408 still need to be performed. Since the eNB1 as the neighboring cell of the HeNB, needs to know the cell information of the HeNB. The X2 interface request message in this step may include the eNB ID of the HeNB or other cell information of the HeNB. Optionally, the message may further include at least one of the information of neighboring cell of the HeNB and the information of the MME pool, to which the HeNB belongs.

Step 408: The eNB1 sends an X2 establishment response message to the DeNB.

The X2 establishment response message includes the target ID. The target ID may be the ID of the target eNB, or the ID of the target cell. For instance, the target ID is the eNB ID of the HeNB. The eNB ID of the HeNB is the same as the cell ID of the HeNB. The message further includes the cell information of the eNB1.

Optionally, the X2 establishment response message further includes the information of the neighboring cell of the eNB1 and the information of the MME pool, to which the eNB1 belongs.

Step 409: The DeNB forwards the X2 establishment response message to the Relay eNB according to the target ID.

In the second exemplary implementation, the third network node initiates an X2 interface establishment process with the first network node.

It is supposed that the first network node is the HeNB, and the second network node is the GW connected with the HeNB. The third network node is the eNB1. The eNB1 may be the eNB, Relay eNB or HeNB.

Figure 5:
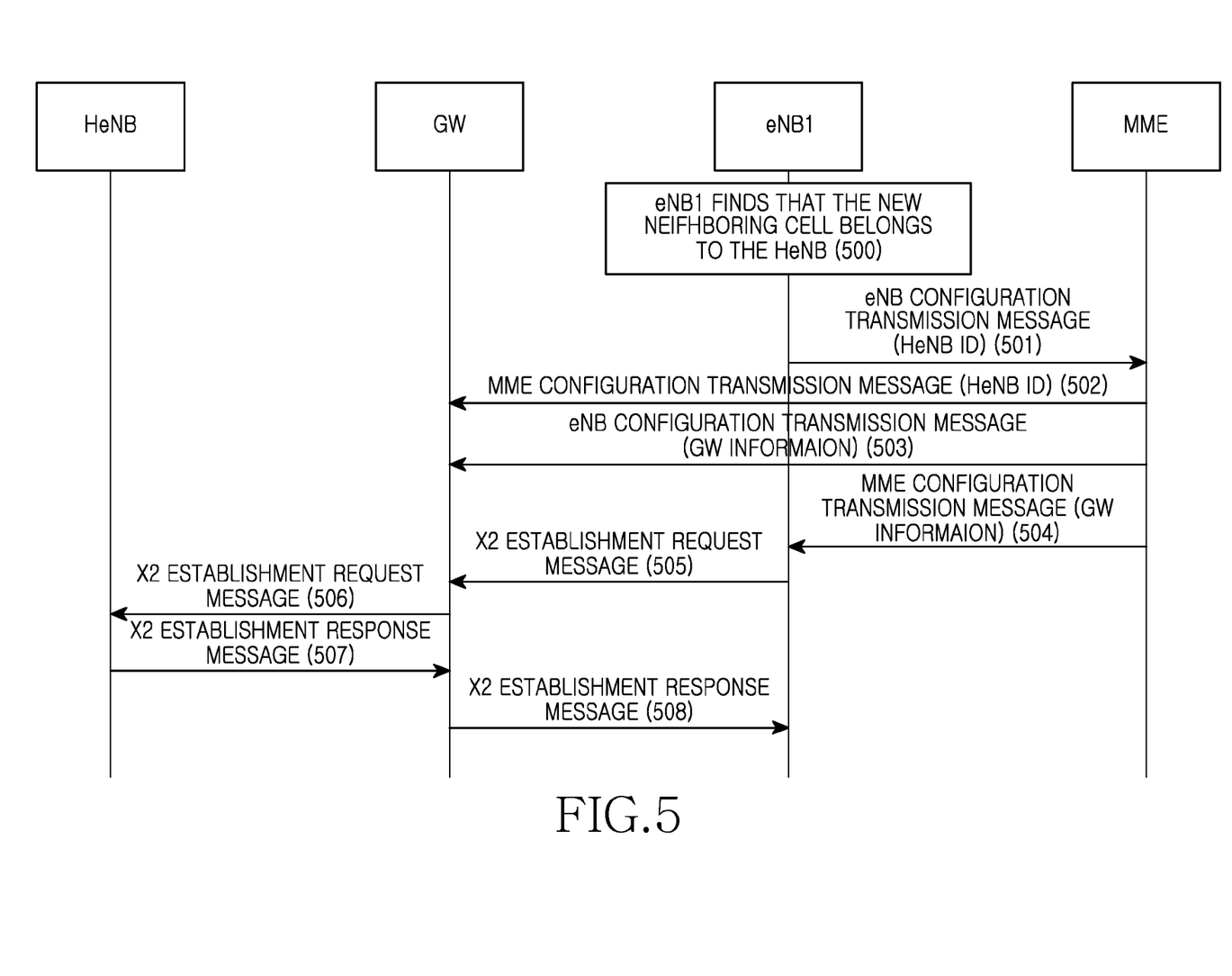
FIG. 5 is a flowchart illustrating a method according to an exemplary embodiment of the present invention.

FIG. 5 is a flowchart illustrating a method according to a second exemplary embodiment of the present invention.

Referring to FIG. 5, the method may include the following steps.

Step 500: The eNB1 finds a new neighboring cell.

The eNB1 receives a measurement report of the UE and determines that the neighboring cell is not saved in the neighboring cell list through the information of the neighboring cell reported by the UE.

The eNB1 determines that a new neighboring cell is found, and adds the new neighboring cell in the neighboring cell list. The UE may further report the information of the neighboring cell, for instance, the information reported by the UE may include the ECGI, TAC and PLMN IDs of the neighboring cell, The eNB ID of the neighboring cell may be determined according to the ECGI of the neighboring cell, and whether an X2 interface has been established between the neighboring cell and the eNB1 is determined. If the X2 interface has not been established, subsequent steps are performed.

It should be noted that the X2 interface between the eNB1 and HeNB consists of two sections. The first section is the X2 interface between the eNB1 and GW, the other section is the X2 interface between the GW and the HeNB.

Furthermore, the eNB1 may determine whether an X2 interface has been established between the eNB1 and the GW, to which the HeNB belongs. If not, step 501 is performed; otherwise step 505 is performed. An exemplary determination process is as follows.

If the first network node is the Relay eNB, the eNB1 obtains the ID of the neighboring cell, i.e. the ECGI in step 500. The eNB ID of the eNB, to which the neighboring cell belongs, may be obtained from the ECGI. The eNB ID of the DeNB is same as that of the Relay eNB. The eNB1 obtains the eNB ID of its DeNB through the eNB ID of the Relay eNB. Thus, the eNB1 may determine whether an X2 interface has been established between the eNB1 and the DeNB. However, if the first network node is the HeNB, the second network node is the GW, the eNB ID of the HeNB is different from that of the GW. The eNB1 obtains the eNB ID of the HeNB in step 500, but whether the X2 connection has been established between the eNB1 and the GW cannot be determined. In the case of the HeNB, it can be determined that a group of special TACs is allocated to the GW. One of the special TACs is allocated to the HeNB connected with the GW. That is to say, the TAC of the HeNB is one of the special TACs. Thus, the eNB1 may obtain the GW connected with the HeNB from the TAC reported by the UE to determine whether an X2 interface has been established between the eNB1 and the GW. This requires configuring of the eNB1 in advance with the operation maintenance. If the operation maintenance is not configured in advance, it requires informing the eNB1 of how to determine through the information in step 503 and/or step 504. An exemplary method will be described in the following steps 503 and 504.

Step 501: The eNB1 sends the eNB configuration transmission message to the MME. The eNB configuration transmission message includes the HeNB information.

The eNB configuration transmission message includes the ID of the target eNB and ID of the source eNB. The source eNB refers to the eNB1, and the target eNB refers to the HeNB. The ID of the source eNB may include the eNB ID of the eNB1, the PLMN Id of the eNB1, and the TAC. The target eNB ID may include the eNB ID of the HeNB, the PLMN Id of the HeNB and the TAC.

Step 502: The MME forwards the information in the eNB configuration transmission message to the GW through the MME configuration transmission message.

One section of the X2 interface between the eNB1 and the HeNB, i.e. the X2 interface between the eNB1 and the GW is first established. Thus, the eNB1 needs to obtain the information of the GW, for instance the transmission layer address of the GW.

The MME determines the GW connected with the HeNB through the target ID in the eNB configuration transmission message, i.e. the eNB ID of the HeNB and the TAC, and forwards the information in the eNB configuration transmission message through the MME configuration transmission message. It is supposed that the MME configures the special TAC group used by the GW in advanced.

If the eNB ID of the first network node is different from that of the second network node, the MME may determine the eNB ID of the second network node according to the corresponding relationship between the eNB ID of the first network node and the eNB ID of the second network node saved in advanced, for instance, the relationship that the TAC used by the HeNB is the subset of the TAC controlled by the GW. The second network node may also report the eNB ID of the first network node to the MME through the S1 message, for instance notify the MME of the eNB ID of the first network node through the eNB configuration update request message when the first network node starts up.

Step 503: The GW sends the eNB configuration transmission message to the MME. The eNB configuration transmission message includes the transmission layer address information of the GW.

In this step, the eNB configuration transmission message may include the information of the GW and the information of eNB1. The information of the GW may include the transmission layer address of the GW, and may further include the ID of the GW, the PLMN ID and the TAC. The information of the eNB1 includes the eNB ID of the eNB1, the PLMN Id and the TAC.

In steps 501 and 502, the source eNB is the eNB1, and the target eNB is the HeNB. According to the conventional protocol, the message of blocks 501 and 502 is for obtaining the transmission layer address of the HeNB, instead of the transmission address of the GW. If the common eNB is configured with the special TAC group used by the GW in advance, and the eNB1 finds that the target eNB uses the special TAC, the eNB1 may consider that the transmission layer address received in step 503 is the transmission layer address of GW, but not the transmission layer address of the HeNB. If the common eNB is not configured with the special TAC group used by the GW in advance, the received information of the target eNB is set as the information of the GW in step 503, and the eNB1 can not differentiate whether the information received is wrong. Thus, the message in this step may further include the indication of the GW, for indicating that the transmission layer address in step 503 is the GW's, but not the eNB's. Optionally, the information of the target eNB in step 503 may be configured as the eNB ID of the GW, the PLMN Id and the TAC.

Step 504: The MME forwards the information in the eNB configuration transmission message through the MME configuration transmission message to the eNB1.

In an exemplary implementation, the message in this step further includes the indication of the GW, for indicating that the transmission layer address in step 504 is the GW's not the eNB's.

The eNB1 obtains the transmission layer address of the GW through steps 501 to 504, and executes step 505 with the transmission layer address of the GW.

Step 505: The eNB1 sends the X2 establishment request message according to the transmission layer address of the GW. The X2 establishment request message includes the cell information of the eNB1 and the target ID.

The target ID may be the ID of the target eNB (i.e. the ID of the HeNB), or the ID of the target cell. In the case of the HeNB, the two IDs are the same.

Optionally, the X2 establishment request message may further include the information of the neighboring cell of the eNB1 and the information of the MME pool, to which the eNB1 belongs. If the first network node is the Relay eNB, the second network node is the DeNB, and the X2 interface between the DeNB and eNB1 has been established, it indicates that the DeNB has saved the information of the eNB1.

Optionally, the X2 establishment request message may further include the cell information of the eNB1, the information of neighboring cell of the eNB1, and the information of the MME pool, to which the eNB1 belongs.

Step 506: The GW forwards the X2 establishment request message to the HeNB according to the target ID.

Similar to the first exemplary embodiments, the X2 establishment request message in this step may include the newly-defined message, or the existing X2 establishment request message. The X2 establishment request message includes the cell information of the eNB1. Optionally, the X2 establishment request message may further include the information of the neighboring cell of the eNB1 and the information of the MME pool, to which the eNB1 belongs.

Step 507: The HeNB sends an X2 establishment response message to the GW.

The X2 establishment response message includes the target ID. The target ID may be the ID of the target eNB (i.e. the ID of the eNB1), or the ID of the target cell. The X2 establishment response message may further include the cell information of the HeNB. Optionally, the X2 establishment response message may further include the information of neighboring cell of the HeNB and the information of the MME pool, to which the HeNB belongs. The cell information may include the unique ID of the cell in the entire network, the physical layer ID of the cell, the TAC, and the PLMN ID etc. The information of the neighboring cell may include the unique ID of the neighboring cell in the entire network, the physical layer ID of the neighboring cell, and the downlink frequency.

It should be noted that if the first network node and the second network node are respectively the Relay eNB and DeNB, this step may directly send the cell information of the Relay eNB through the X2 establishment response message, or only send the target ID, since the X2 interface has been established between the Relay and the DeNB, and the DeNB has saved the information of the Relay cell.

Step 508: The GW forwards the X2 establishment response message to the eNB1.

The message includes the cell information of the HeNB, the eNB ID of the HeNB. Optionally, the message may further include the information of the neighboring cell of the HeNB and the information of the MME pool, to which the HeNB belongs.

It should be noted that if the first network node and the second network node are respectively the Relay eNB and the DeNB, this step may directly send the cell information of the Relay eNB through the X2 establishment response message. The message includes the indication of the Relay cell, for indicating that this is the Relay cell. The cell information of the Relay eNB may be taken as the service cell of the Relay eNB and sent to the eNB1, i.e. the cell information of the DeNB is sent out and the cell of the Relay eNB is taken as the service cell of the DeNB.

The establishment of the X2 interface of the first network node and the third network node is completed through the above first embodiment and second exemplary embodiments.

If the configuration information or load information of the first network node or the third network node changes, the process that the first network node communicates with the third network node is described through the following the third and the fourth exemplary embodiments.

In the third exemplary embodiments, the configuration information or load of the first network node changes.

In this exemplary embodiment, the first network node may be the Relay eNB or the HeNB, and the third network node may be the eNB, Relay eNB or the HeNB. In this exemplary embodiment, it is assumed that the first network node is the Relay eNB and the third network node is the eNB1.

Figure 6:
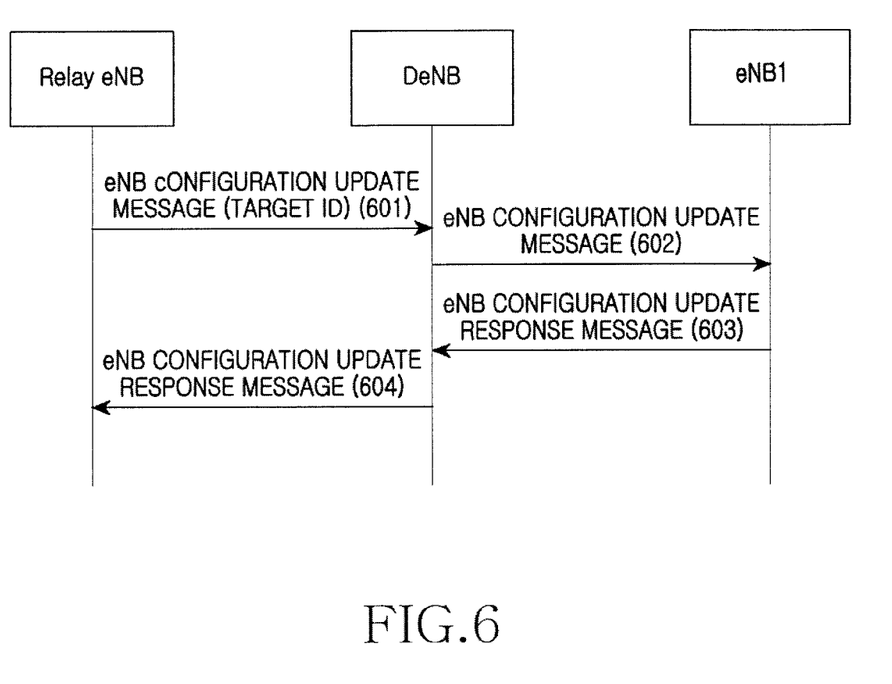
FIG. 6 is a flowchart illustrating a method according to an exemplary embodiment of the present invention.

FIG. 6 is a flowchart illustrating a method according to an exemplary embodiment of the present invention.

Referring to FIG. 6, the method may include the following steps.

Step 601: The neighboring cell of the Relay eNB belongs to the eNB1. The cell configuration information or load information of the Relay eNB changes, the eNB configuration update message is sent to the eNB1, to which the neighboring cell belongs.

The eNB configuration update message may include the changed cell configuration information or load information of the Relay eNB, for instance, the changed cell frequency information, information of the interference performed by the neighboring cell on the service cell.

The eNB configuration update message may further include the target ID, which may be the ID of the eNB1 or the ID of the target cell.

Step 602: The DeNB sends the eNB configuration update message to the eNB1 according to the target ID.

Step 603: The eNB1 sends the eNB configuration update response message to the DeNB. The eNB configuration update response message may include the ID of the Relay eNB.

Step 604: The DeNB forwards an eNB configuration update response message to the Relay eNB.

In the fourth exemplary embodiment, the configuration information or load of the third network node changes.

The first network node in this exemplary embodiment may be the Relay eNB or the HeNB, and the third network node may be the eNB, Relay eNB or the HeNB. The following exemplary embodiment assumes that the first network node is the HeNB and the third network node is the eNB1.

Figure 7:
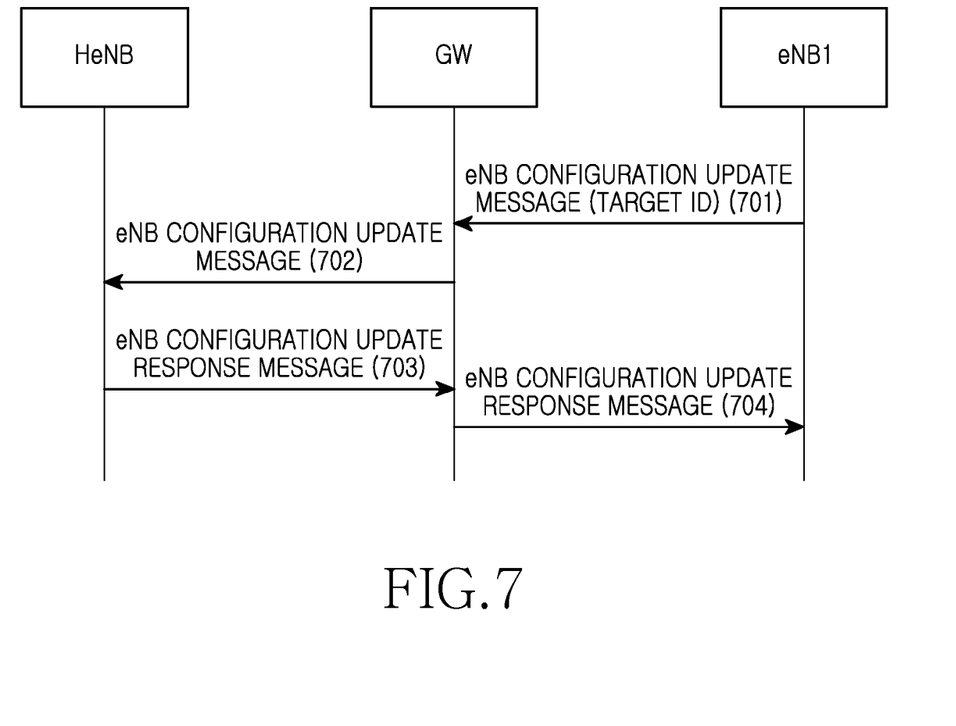
FIG. 7 is a flowchart illustrating a method according to an exemplary embodiment of the present invention.

FIG. 7 is a flowchart illustrating a method according to a fourth exemplary embodiment of the present invention.

Referring to FIG. 7, the method may include the following steps.

Step 701: If the cell configuration information or load information of the eNB1 changes, the eNB configuration update message is sent to the GW. The eNB configuration update message includes the target ID, and changed cell configuration information or load information.

The cell configuration information may be the frequency of the cell, information of the interference performed by the neighboring cell on the service cell. The target ID may be the ID of the target eNB, i.e. the HeNB, or the ID of the target cell.

Step 702: The GW forwards the eNB configuration update message to the HeNB according to the target ID in the eNB configuration update message.

Step 703: The HeNB sends an eNB configuration update response message to the GW. The eNB configuration update response message includes the ID of the eNB1.

Step 704: The GW forwards the eNB configuration update response message to the eNB1.

Figure 8:
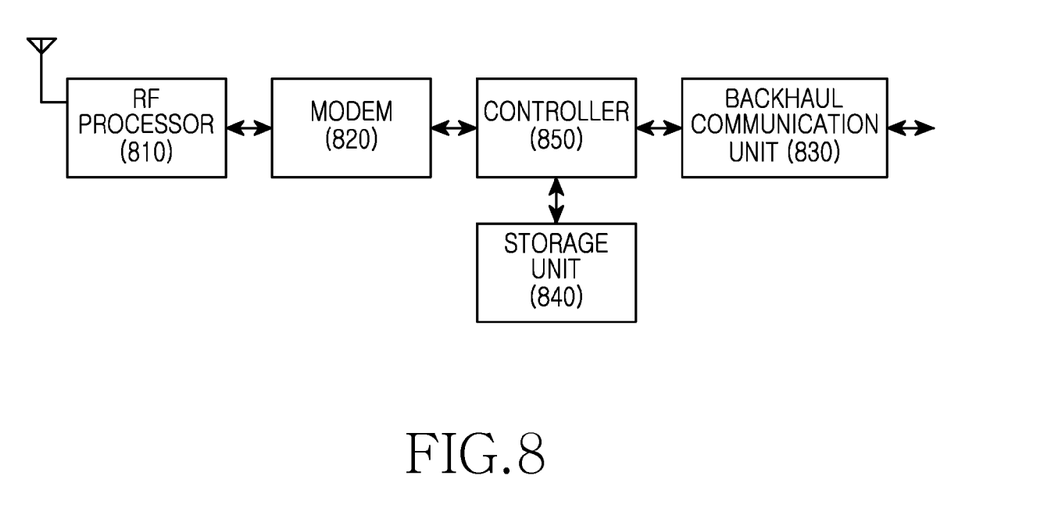
FIG. 8 is a block diagram of an eNB according to an exemplary embodiment of the present invention.

FIG. 8 is a block diagram of an eNB according to an exemplary embodiment of the present invention.

Referring to FIG. 8, the eNB includes a Radio Frequency (RF) processor 810, a modem 820, a backhaul communication unit 830, a storage unit 840 and a controller 850. The eNB comprises normal eNB, DeNB and HeNB.

The RF processor 810 performs functions, such as signal band conversion and amplification, to transmit and receive signals over a radio channel. That is, the RF processor 810 up-converts a baseband signal output from the modem 820 into the RF signal and transmits the RF signal over an antenna, and down-converts the RF signal received over the antenna into the baseband signal. Although not illustrated, for example, the RF processor 810 may include an amplifier, a mixer, an oscillator, a Digital to Analog Convertor (DAC), an Analog to Digital Convertor (ADC) and the like.

The modem 820 converts the baseband signal and a bit string according to a physical layer standard of the system. For example, to transmit data, the modem 820 generates complex symbols by encoding and modulating a transmit bit string, maps the complex symbols to subcarriers, and constitutes Orthogonal Frequency-Division Multiplexing (OFDM) symbols by applying Inverse Fast Fourier Transform (IFFT) and inserting a Cyclic Prefix (CP). When receiving data, the modem 820 splits the baseband signal output from the RF processor 810 into OFDM symbols, restores the signals mapped to the subcarriers using Fast Fourier Transform (FFT), and restores the receive bit string by demodulating and decoding the signals.

The backhaul communication unit 830 provides an interface for the eNB to communicate with other entities (i.e., other eNBs, an MME and the like). More specifically, the backhaul communication unit 830 converts the bit string transmitted by the eNB into a physical signal, and converts the physical signal received at the eNB into the bit string. The storage unit 840 stores program codes and system information required for the operations of the eNB. The storage unit 840 provides stored data to the controller 850 upon a request from the controller 850.

The controller 850 controls the functions of the eNB. For example, the controller 850 generates a transmit packet and a message and provides the modem 820 with the transmit packet and the message. The controller 850 also processes a receive packet and a message from the modem 820. More particularly, according to an exemplary embodiment of the present invention, the controller 850 controls a procedure to establish an X2 interface with another eNB, For example, the controller 850 controls a procedure to establish an X2 interface as illustrated in FIG. 4 to 7.

It can be seen from the above description that the exemplary embodiment provides a method and apparatus for establishing an X2 interface between the Relay eNB or HeNB and the other eNBs of the newly-found neighboring cell after the Relay eNB or HeNB finds a new neighboring cell, and further provides a method and apparatus for establishing an X2 interface between other eNBs and the Relay eNB or the HeNB after the other eNBs find the new neighboring cell. Thus, the Relay eNB and HeNB may establish the X2 interface connection with other eNBs, so that the X2 interface based application, such as the mobile handover can be implemented.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for establishing a connection between evolved Node Bs (eNBs), the method comprising:
    after finding a new neighboring cell of a first network node and determining an X2 interface not being established between the first network node and the neighboring cell belongs to a second network, receiving, at a third network node, a first request message from a Mobility Management Entity (MME);
    transmitting, at the third network node, a first response message to the MME;
    receiving, at the third network node, a second request message from the first network node;
    transmitting, at the third network node, a second request message to the second network node;
    receiving, at the third network node, a second response message from the second network node; and
    transmitting, at the third network node, the second response message to the first network node;
    wherein the first network node comprises at least one of a Relay eNB, a Home eNB (HeNB), or an eNB,
    wherein the second network node comprises a HeNB,
    wherein the third network node comprises a Gateway (GW) connected with the HeNB,
    wherein the first request message comprises an MME configuration transmission message including at least of the eNB ID of the HeNB, a Public Land Mobile Network ID (PLMN ID) of the HeNB, and a Tacking Area Code (TAC),
    wherein the first response message comprises an eNB configuration transmission message including the transmission layer address of the third network node, wherein the second request message comprises an X2 establishment request message according to the transmission layer address of the third network node, and wherein the second response message comprises an X2 establishment response message including the cell ID of the HeNB or the eNB ID of the HeNB.

2. The method according to claim 1, wherein the second request message further comprises a cell information of the first network node and the target ID.

3. The method according to claim 2, wherein the target ID is the ID of the HeNB or the ID of the target cell, and wherein in the case of the HeNB, the ID of the HeNB and the ID of the target cell are the same.

4. The method according to claim 1, wherein the second request message further comprises a cell information of the first network node, an information of the neighboring cell of the first network node, and an information of an MME pool to which the first network node belongs.

5. The method according to claim 1, wherein the second response message further comprises an information of the neighboring cell of the HeNB and an information of an MME pool to which the second network node belongs.

6. The method according to claim 1, further comprising, before receiving the first request message from the MME,
transmitting, at the first network node, the first request message including information of the second network node to the MME.

7. The method according to claim 1, further comprising, before receiving the second request message from the first network node,
receiving, at the first network node, the first response message from the MME.

8. A method for establishing a connection between evolved Node Bs (eNBs), the method comprising:
after finding a new neighboring cell of a third network node, determining, at a first network node, whether an X2 interface is established between the neighboring cell and the first network node;
if the X2 interface is not established, transmitting, at the first network node, a first request message including information of a second network node, to which the neighboring cell belongs, to a Mobility Management Entity (MME);
receiving, at the first network node, a first response message from the MME;
if the X2 interface is established or after receiving the first response message, transmitting, at the first network node, a second request message to a third network node; and
receiving, at the first network node, a second response message from the third network node,
wherein the first network node comprises at least one of a Relay eNB, a Home eNB (HeNB), or an eNB,
wherein the second network node comprises a HeNB,
wherein the third network node comprises a Gateway (GW) connected with the HeNB,
wherein the first request message comprises an eNB configuration transmission message including an ID of a target eNB and ID of a source eNB,
wherein the target eNB ID includes the eNB ID of the HeNB, a Public Land Mobile Network ID (PLMN ID) of the HeNB, and a Tacking Area Code (TAC),
wherein the first response message comprises an MME configuration transmission message including the transmission layer address of the third network node, wherein the second request message comprises an X2 establishment request message according to the transmission layer address of the third network node, wherein the second response message comprises an X2 establishment response message including the cell ID of the HeNB or the eNB ID of the HeNB.

9. The method according to claim 8, wherein the second request message further comprises a cell information of the first network node and the target ID.

10. The method according to claim 9, wherein the target ID is the ID of the HeNB or the ID of the target cell, and wherein in the case of the HeNB, the ID of the HeNB and the ID of the target cell are the same.

11. The method according to claim 8, wherein the second request message further comprises a cell information of the first network node, an information of the neighboring cell of the first network node, and an information of an MME pool to which the first network node belongs.

12. The method according to claim 8, further comprising, after transmitting the first request message to the MME:
receiving, at the third network node, the first request message from the MME; and
transmitting, at the third network node, the first response message to the MME.

13. The method according to claim 8, further comprising, after transmitting, at the first network node, the second request message to the third network node:
transmitting, at the third network node, the second request message to the second network node; and
receiving, at the third network node, a second response message from the second network node.

14. An apparatus for establishing a connection between evolved Node Bs (eNBs), the apparatus comprising at least one network node configured to:
after finding a new neighboring cell of a first network node and determining an X2 interface not being established between the first network node and the neighboring cell belonging to a second network, receive, at a third network node, a first request message from a Mobility Management Entity (MME);
transmit, at the third network node, a first response message to the MME;
receive, at the third network node, a second request message from the first network node;
transmit, at the third network node, the second request message to the second network node;
receive, at the third network node, a second response message from the second network node; and
transmit, at the third network node, the second response message to the first network node,
wherein the first network node comprises at least one of a Relay eNB, a Home eNB (HeNB), and an eNB,
wherein the second network node comprises a HeNB,
wherein the third network node comprises a Gateway (GW) connected with the HeNB,
wherein the first request message comprises an MME configuration transmission message including at least of the eNB ID of the HeNB, a Public Land Mobile Network ID (PLMN ID) of the HeNB, and a Tacking Area Code (TAC),
wherein the first response message comprises eNB configuration transmission message including the transmission layer address of the third network node,
wherein the second request message comprises an X2 establishment request message according to the transmission layer address of the third network node, and wherein the second response message comprises an X2 establishment response message including the cell ID of the HeNB or the eNB ID of the HeNB.

15. The apparatus according to claim 14, wherein the second request message further comprises a cell information of the first network node and the target ID.

16. The apparatus according to claim 15, wherein the target ID is the ID of the HeNB or the ID of the target cell, and wherein in the case of the HeNB, the ID of the HeNB and the ID of the target cell are the same.

17. The apparatus according to claim 14, wherein the second request message further comprises a cell information of the first network node, an information of the neighboring cell of the first network node, and an information of an MME pool to which the first network node belongs.

18. The apparatus according to claim 14, wherein the second response message further comprises an information of the neighboring cell of the HeNB and an information of an MME pool to which the second network node belongs.

19. The apparatus according to claim 14, further configured to, before receiving the first request message from the MME,
transmit, at the first network node, the first request message including information of the second network node to the MME.

20. The apparatus according to claim 14, further configured to, before receiving the second request message from the first network node,
receive, at the first network node, the first response message from the MME.

21. An apparatus for establishing a connection between evolved Node Bs (eNBs), the apparatus comprising at least one network node configured to:
after finding a new neighboring cell of a first network node, determine, at the first network node, whether an X2 interface is established between the neighboring cell and the first network node;
if the X2 interface is not established, transmit, at the first network node, a first request message including information of a second network node, to which the neighboring cell belongs, to a Mobility Management Entity (MME);
receive, at the first network node, a first response message from the MME;
if the X2 interface is established or after receiving the first response message, transmit, at the first network node, a second request message to a third network node; and
receive, at the first network node, a second response message from the third network node,
wherein the first network node comprises at least one of a Relay eNB, a Home eNB (HeNB), and an eNB,
wherein the second network node comprises a HeNB,
wherein the third network node comprises a Gateway (GW) connected with the HeNB,
wherein the first request message comprises a eNB configuration transmission message including an ID of a target eNB and ID of a source eNB,
wherein the target eNB ID includes the eNB ID of the HeNB, a Public Land Mobile Network ID (PLMN ID) of the HeNB, and a Tacking Area Code (TAC),
wherein the first response message comprises an MME configuration transmission message including the transmission layer address of the third network node,
wherein the second request message comprises an X2 establishment request message according to the transmission layer address of the third network node, and
wherein the second response message comprises an X2 establishment response message including the cell ID of the HeNB or the eNB ID of the HeNB.

22. The apparatus according to claim 21, wherein second request message further comprises a cell information of the first network node and the target ID.

23. The apparatus according to claim 22, wherein the target ID is the ID of the HeNB or the ID of the target cell, and wherein in the case of the HeNB, the ID of the HeNB and the ID of the target cell are the same.

24. The apparatus according to claim 21, wherein the second request message further comprises a cell information of the first network node, an information of the neighboring cell of the first network node, and an information of an MME pool to which the first network node belongs.

25. The apparatus according to claim 21, wherein the second response message further comprises an information of the neighboring cell of the HeNB and an information of an MME pool to which the second network node belongs.

26. The apparatus according to claim 21, further configured to, after transmitting the first request message to the MME:
receive, at the third network node, the first request message from the MME; and
transmit, at the third network node, the first response message to the MME.

27. The apparatus according to claim 21, further configured to, after transmitting, at the first network node, the second request message to the third network node:
transmit, at the third network node, the second request message to the second network node; and
receive, at the third network node, a second response message from the second network node.

* * * * *